United States Patent
Agrawal et al.

(10) Patent No.: US 11,831,180 B2
(45) Date of Patent: Nov. 28, 2023

(54) APPARATUS AND METHOD FOR TRANSMITTING A SIGNAL IN A WIRELESS POWER TRANSMITTER

(71) Applicants: SAMSUNG ELECTRONICS CO., LTD., Suwon-si (KR); DELHI TECHNOLOGICAL UNIVERSITY, New Delhi (IN)

(72) Inventors: Sachin Kumar Agrawal, Uttar Pradesh (IN); Kapil Sharma, New Delhi (IN)

(73) Assignees: SAMSUNG ELECTRONICS CO., LTD., Suwon-si (KR); DELHI TECHNOLOGICAL UNIVERSITY, New Delhi (IN)

( * ) Notice: Subject to any disclaimer, the term of this patent is extended or adjusted under 35 U.S.C. 154(b) by 546 days.

(21) Appl. No.: 17/252,922

(22) PCT Filed: May 21, 2019

(86) PCT No.: PCT/KR2019/006090
§ 371 (c)(1),
(2) Date: Dec. 16, 2020

(87) PCT Pub. No.: WO2019/245171
PCT Pub. Date: Dec. 26, 2019

(65) Prior Publication Data
US 2021/0265874 A1     Aug. 26, 2021

(30) Foreign Application Priority Data

Jun. 18, 2018 (IN) .............................. 201811022745

(51) Int. Cl.
*H02J 50/80* (2016.01)
*H02J 50/40* (2016.01)
(Continued)

(52) U.S. Cl.
CPC .............. *H02J 50/80* (2016.02); *G01S 13/04* (2013.01); *G06F 16/27* (2019.01); *H02J 7/0047* (2013.01); *H02J 50/40* (2016.02)

(58) Field of Classification Search
CPC .......... H02J 50/80; H02J 7/0047; H02J 50/40; H02J 50/20; G01S 13/04; G06F 16/27;
(Continued)

(56) References Cited

U.S. PATENT DOCUMENTS 6,967,462 B1    11/2005   Landis
7,995,969 B2     8/2011   Hardacker
(Continued)

FOREIGN PATENT DOCUMENTS

WO    WO-2019245171 A1 *  12/2019   .............. G01S 13/04

OTHER PUBLICATIONS

International Search Report for PCT/KR2019/006090 dated Aug. 16, 2019, 3 pages.
(Continued)

*Primary Examiner* — Stacy Whitmore
(74) *Attorney, Agent, or Firm* — Nixon & Vanderhye, P.C.

(57) ABSTRACT

A method comprises obtaining device information associated with one or more computing devices, the device information comprises at least a location of each of the one or more computing devices. Based on the device information, one or more UWCFs corresponding to the one or more computing devices are adapted such that a UWCF is a sub-area of an open zone, where the open zone is an area having reflection characteristics below a reference reflection threshold. A charging rate for each of the one or more computing devices based on the one or more UWCFs is determined. A beamformed signal is then transmitted within corresponding UWCF of each of the one or more computing
(Continued)

devices based on corresponding charging rate for wirelessly charging the one or more computing devices.

15 Claims, 12 Drawing Sheets

(51) Int. Cl.
    *G06F 16/27*     (2019.01)
    *G01S 13/04*     (2006.01)
    *H02J 7/00*     (2006.01)

(58) Field of Classification Search
    CPC ........ G05B 2219/15117; G05B 19/042; G05B 2219/25283
    See application file for complete search history.

(56) References Cited

U.S. PATENT DOCUMENTS

| | | | | |
|---|---|---|---|---|
| 11,723,039 | B2 * | 8/2023 | Xue | .................. H04W 72/046 370/329 |
| 2012/0299706 | A1 | 11/2012 | Koo et al. | |
| 2012/0326660 | A1 * | 12/2012 | Lu | .......................... H02J 50/20 320/108 |
| 2014/0316261 | A1 | 10/2014 | Lux et al. | |
| 2015/0175025 | A1 | 6/2015 | Barbul et al. | |
| 2016/0033254 | A1 | 2/2016 | Zeine et al. | |
| 2016/0049824 | A1 | 2/2016 | Stein et al. | |
| 2016/0099758 | A1 * | 4/2016 | Bell | ...................... H04W 12/08 307/104 |
| 2017/0256988 | A1 | 9/2017 | Joyce et al. | |
| 2017/0256994 | A1 | 9/2017 | Joyce et al. | |
| 2017/0273058 | A1 | 9/2017 | Agiwal et al. | |
| 2017/0288475 | A1 | 10/2017 | Lee et al. | |
| 2023/0236303 | A1 * | 7/2023 | Trainin | .................. G01S 7/006 342/146 |

OTHER PUBLICATIONS

Written Opinion of the ISA for PCT/KR2019/006090 dated Aug. 16, 2019, 4 pages.

* cited by examiner

[Fig. 1a]
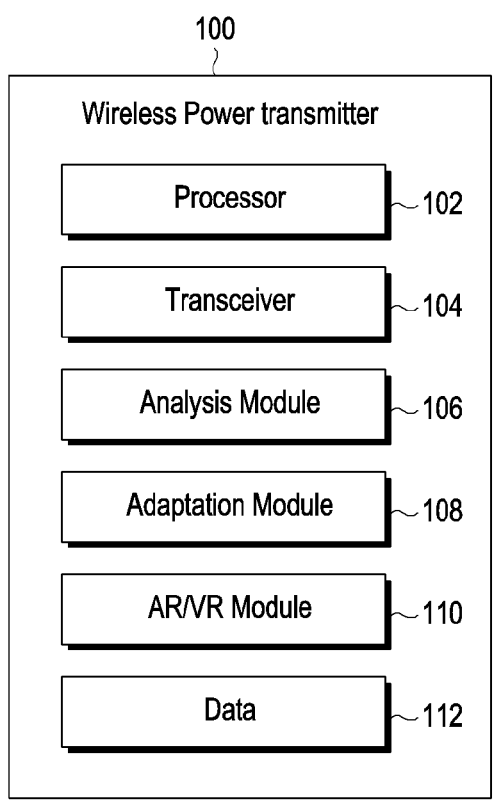

[Fig. 1b]
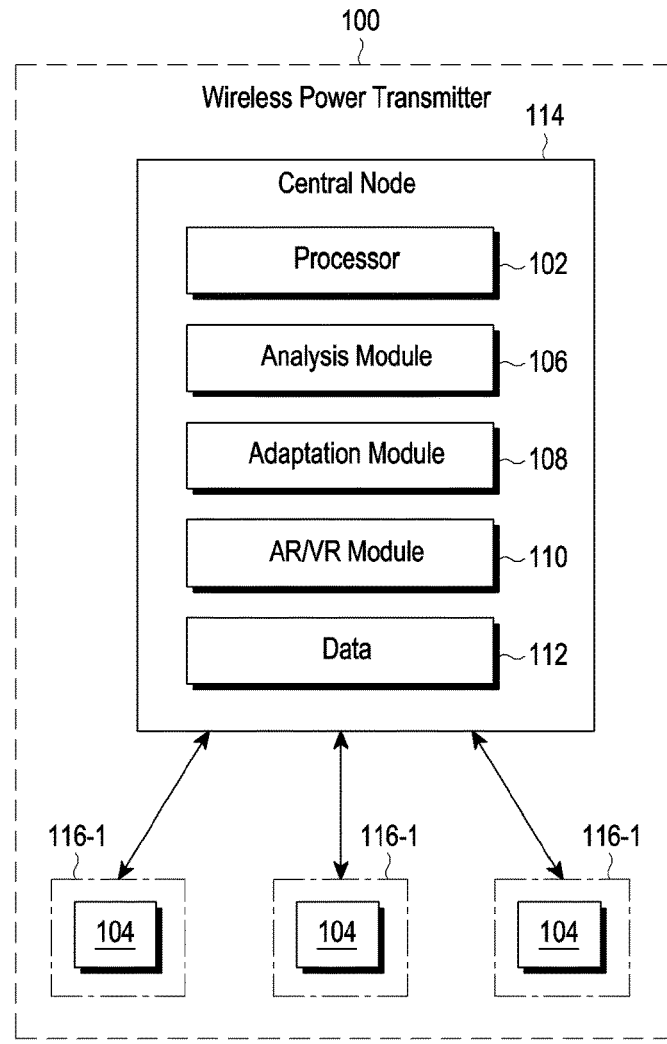
[Fig. 1c]
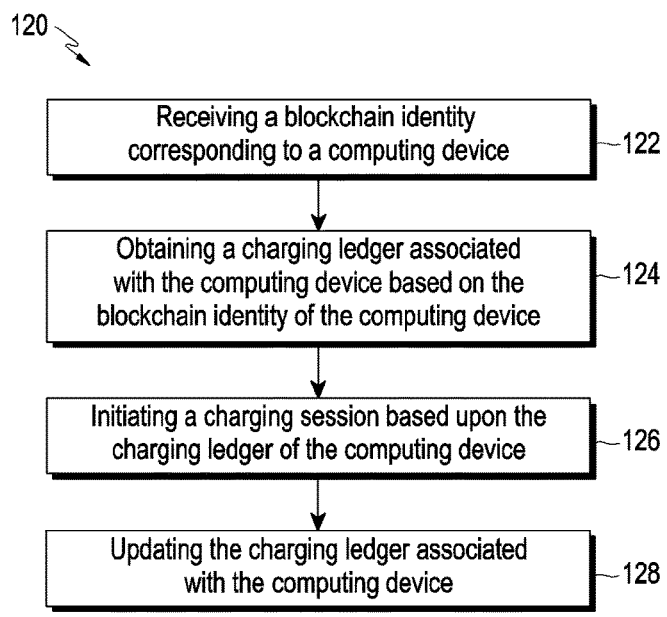

[Fig. 2]
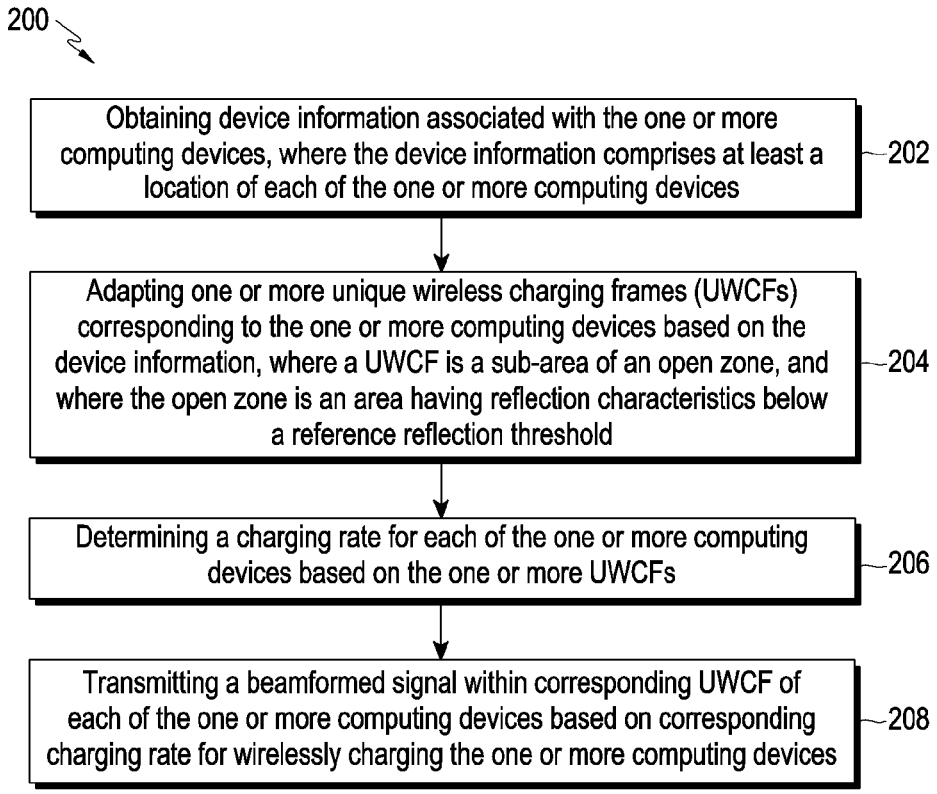
[Fig. 3a]
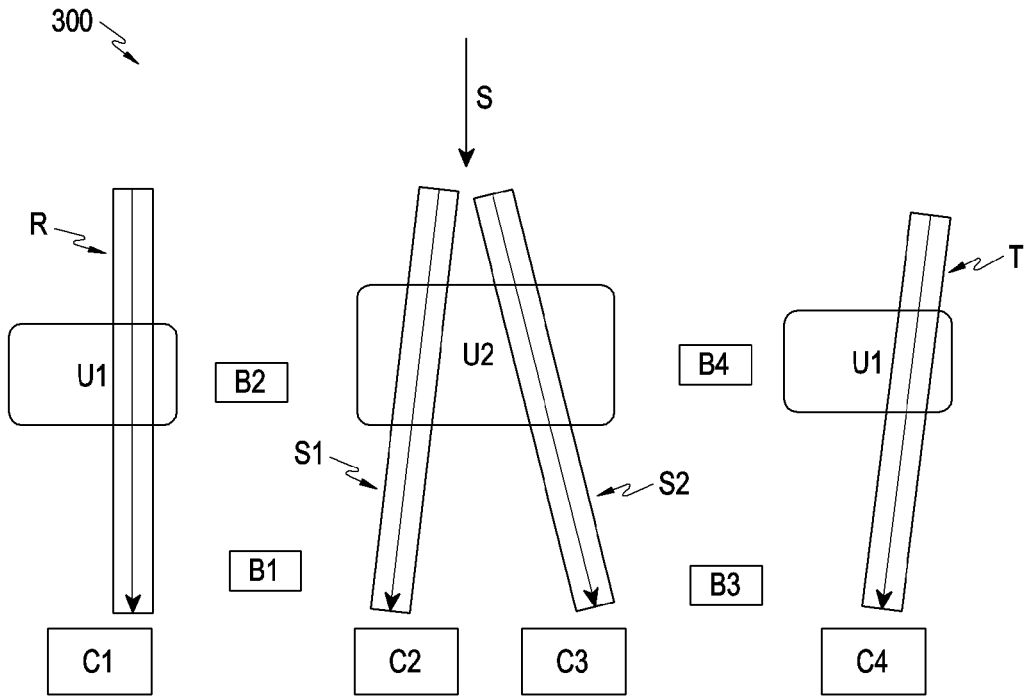

[Fig. 3b]
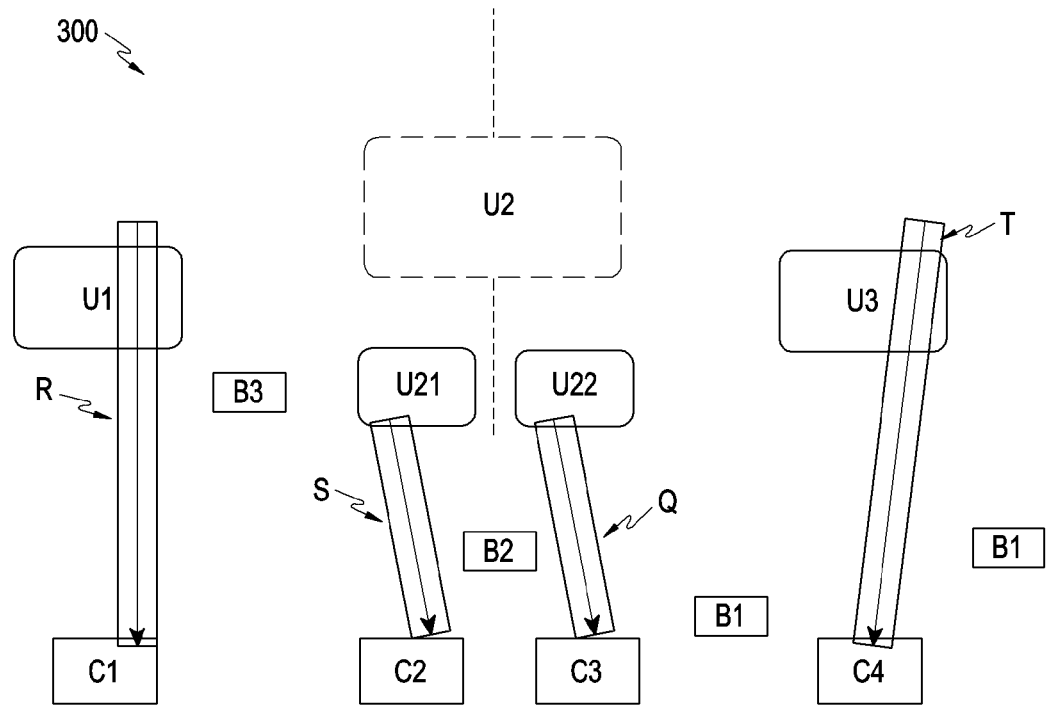
[Fig. 3c]
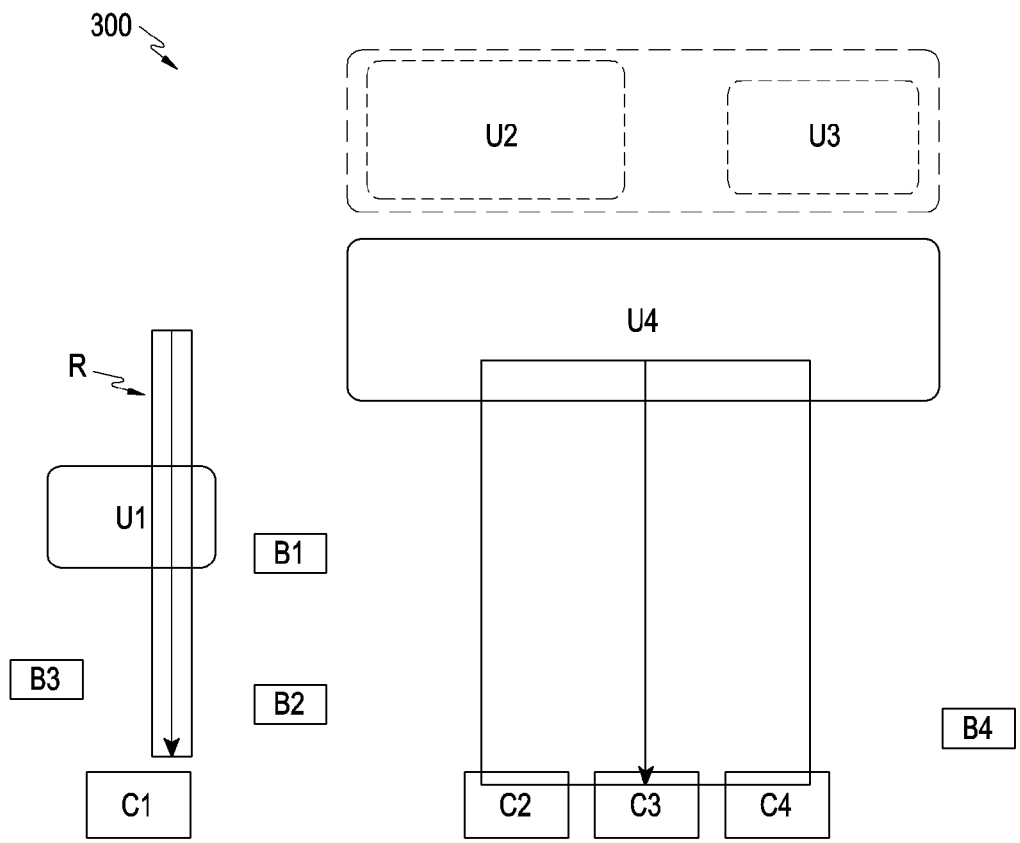

[Fig. 3d]
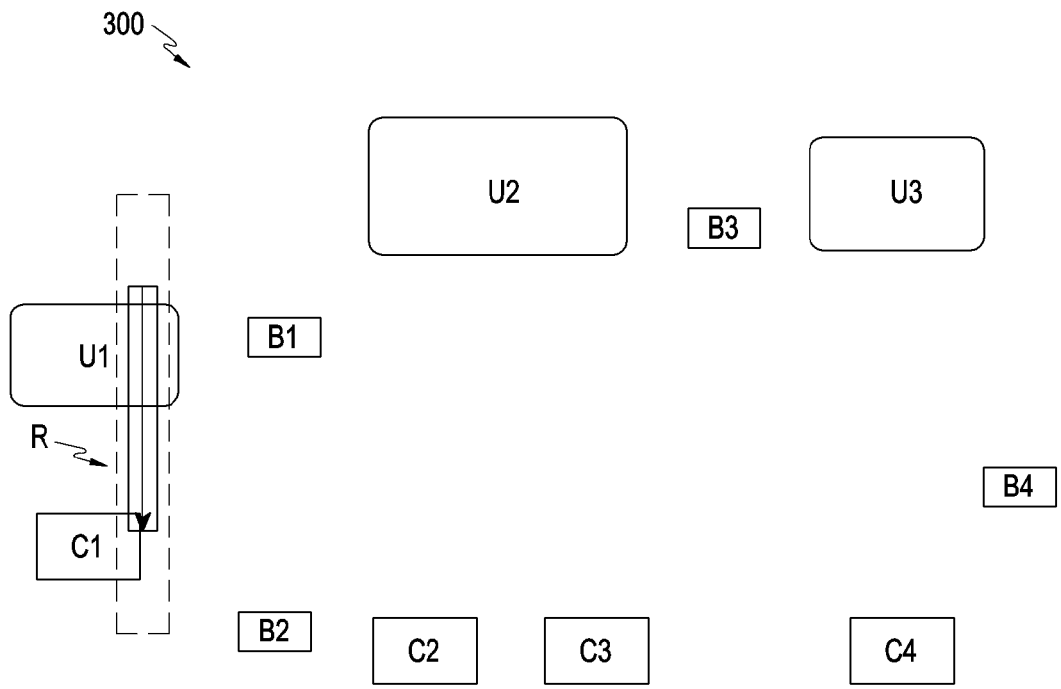
[Fig. 3e]
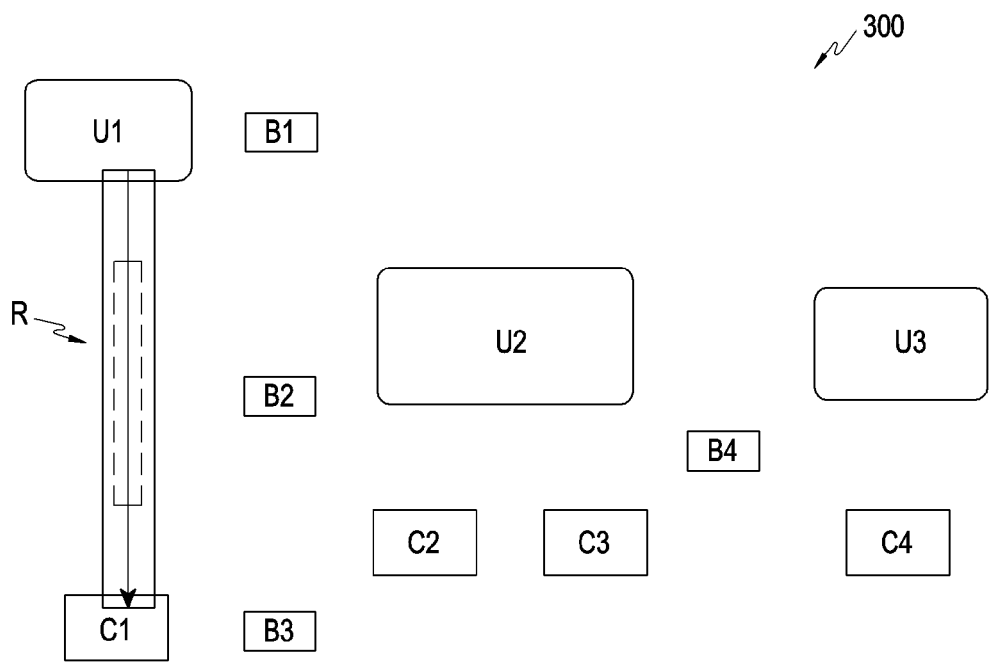

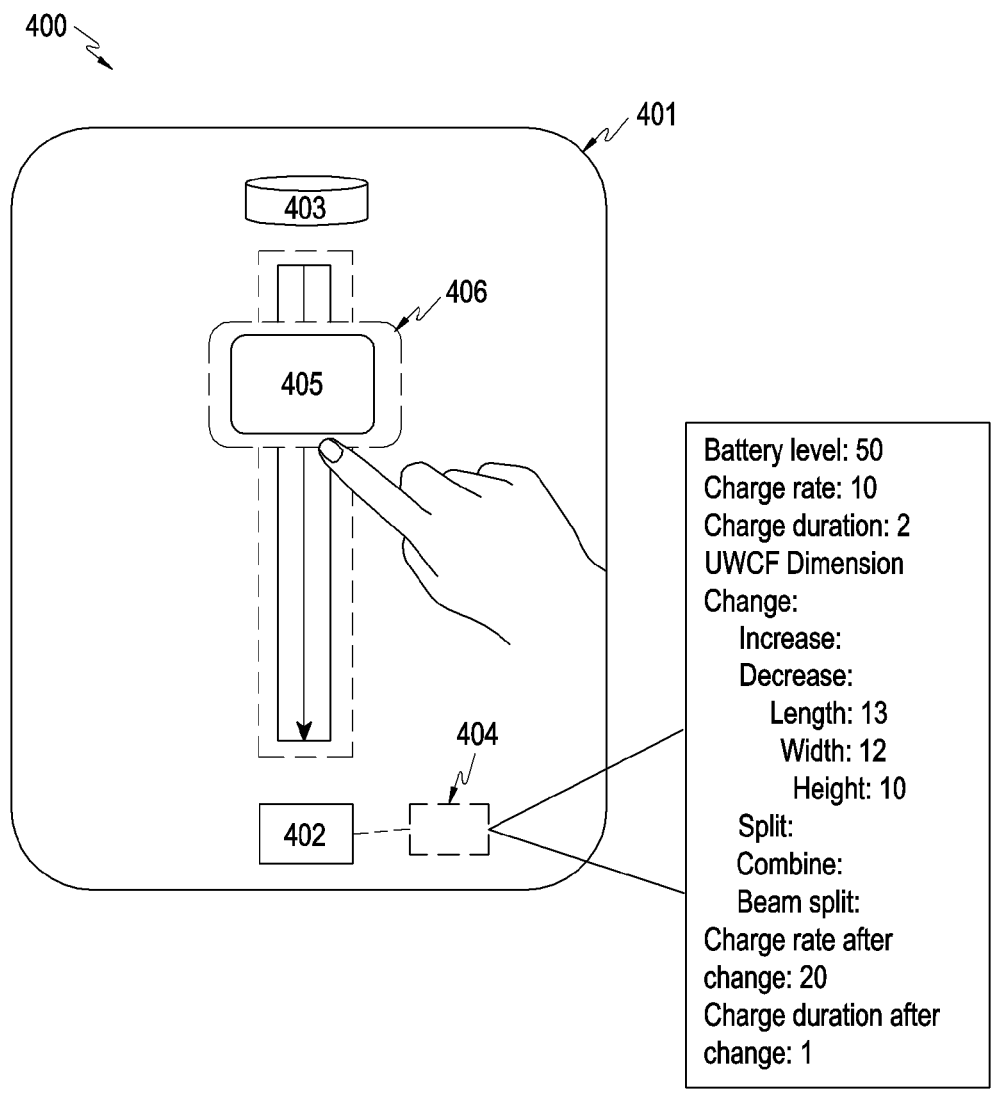
[Fig. 4a]

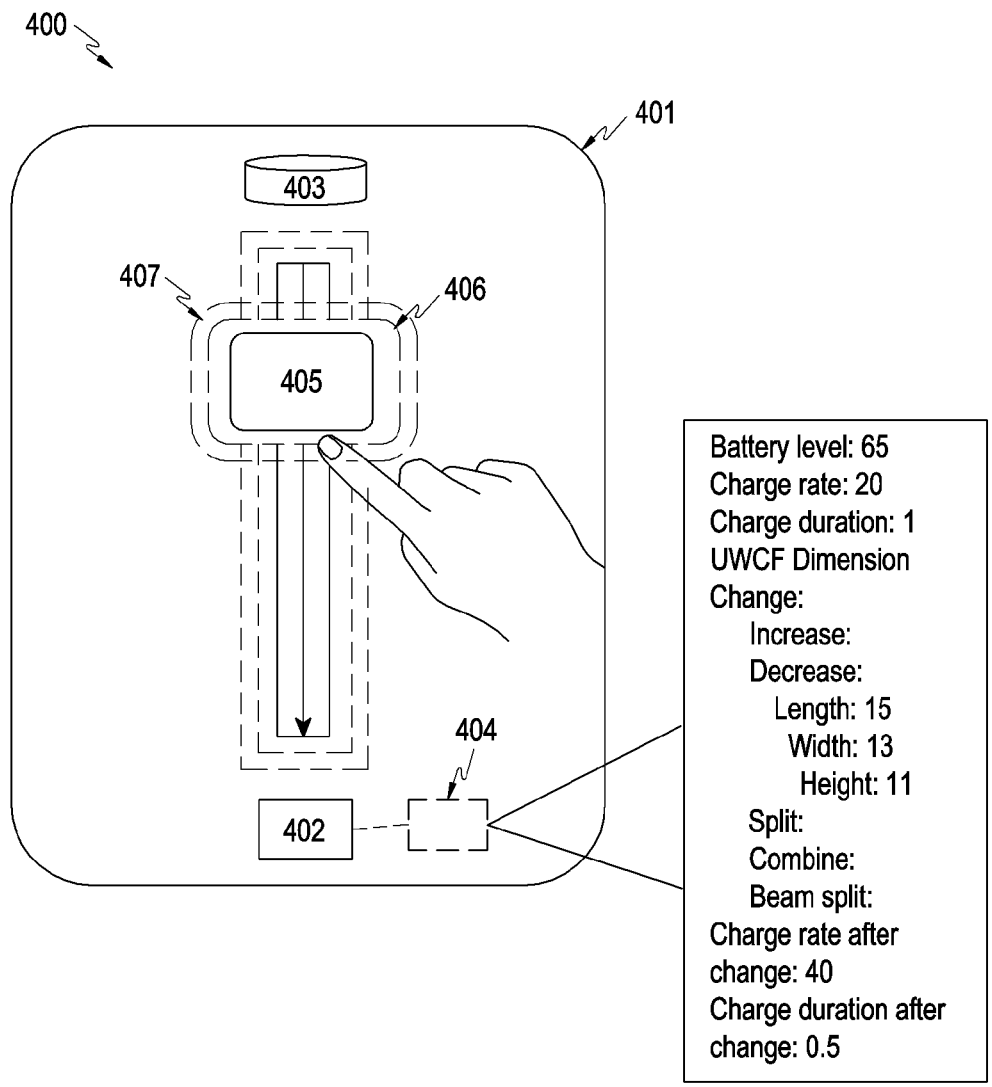
[Fig. 4b]

[Fig. 4c]
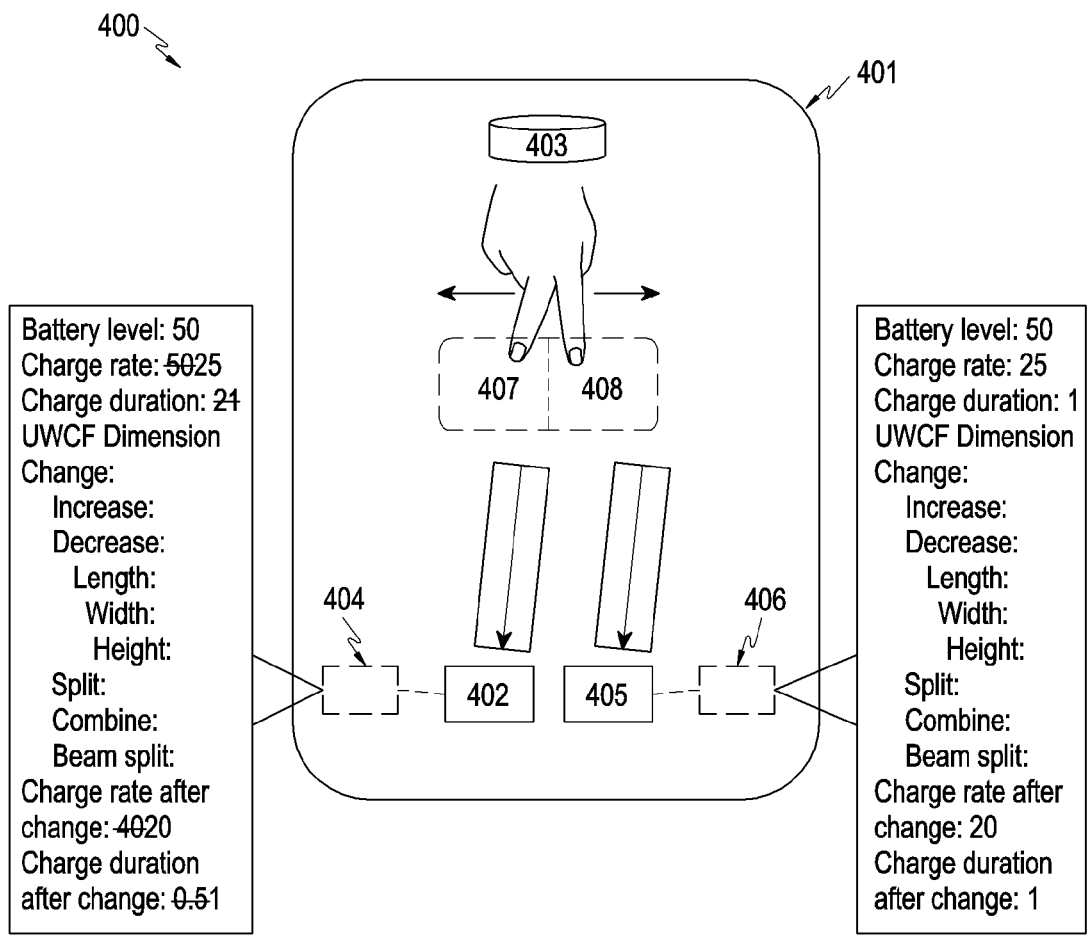

[Fig. 4d]
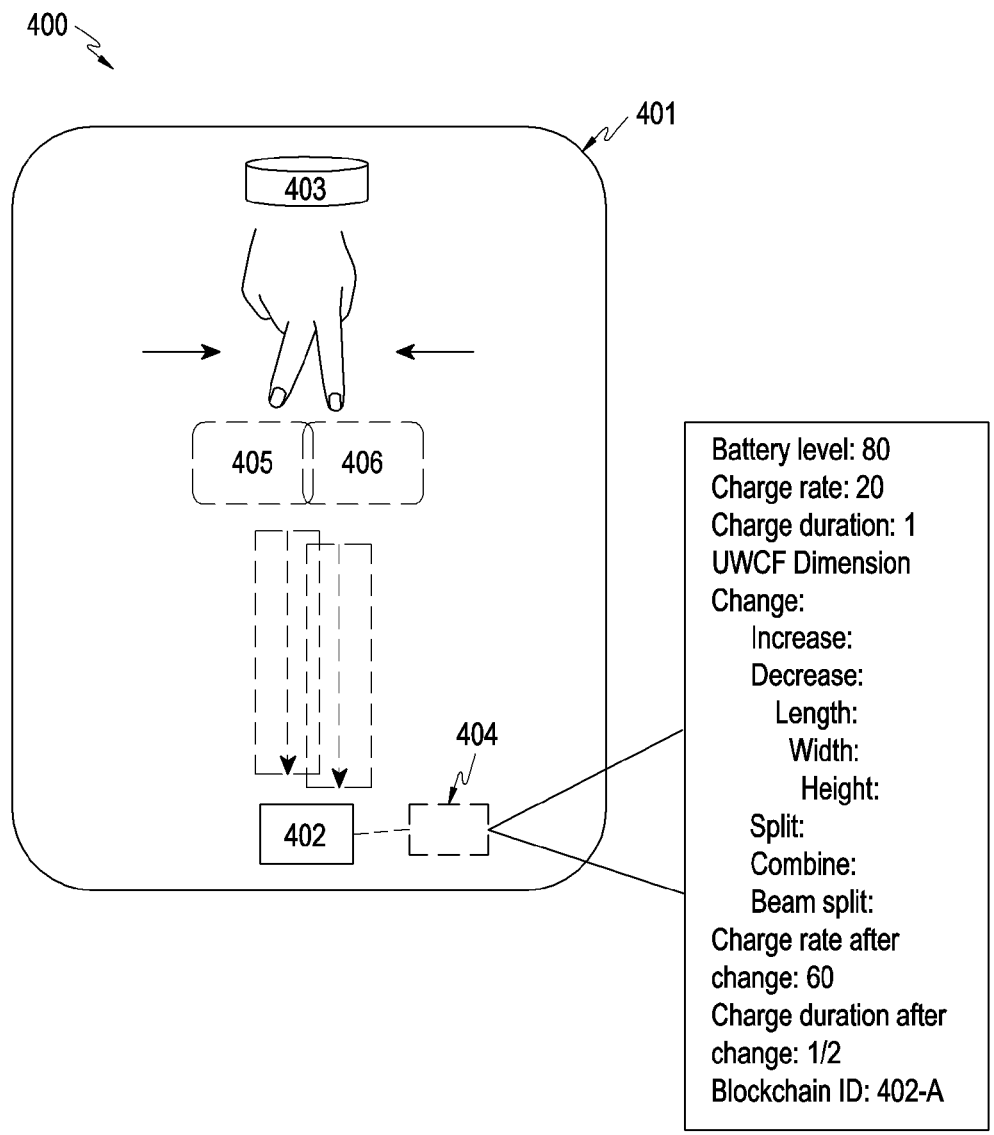

[Fig. 4e]
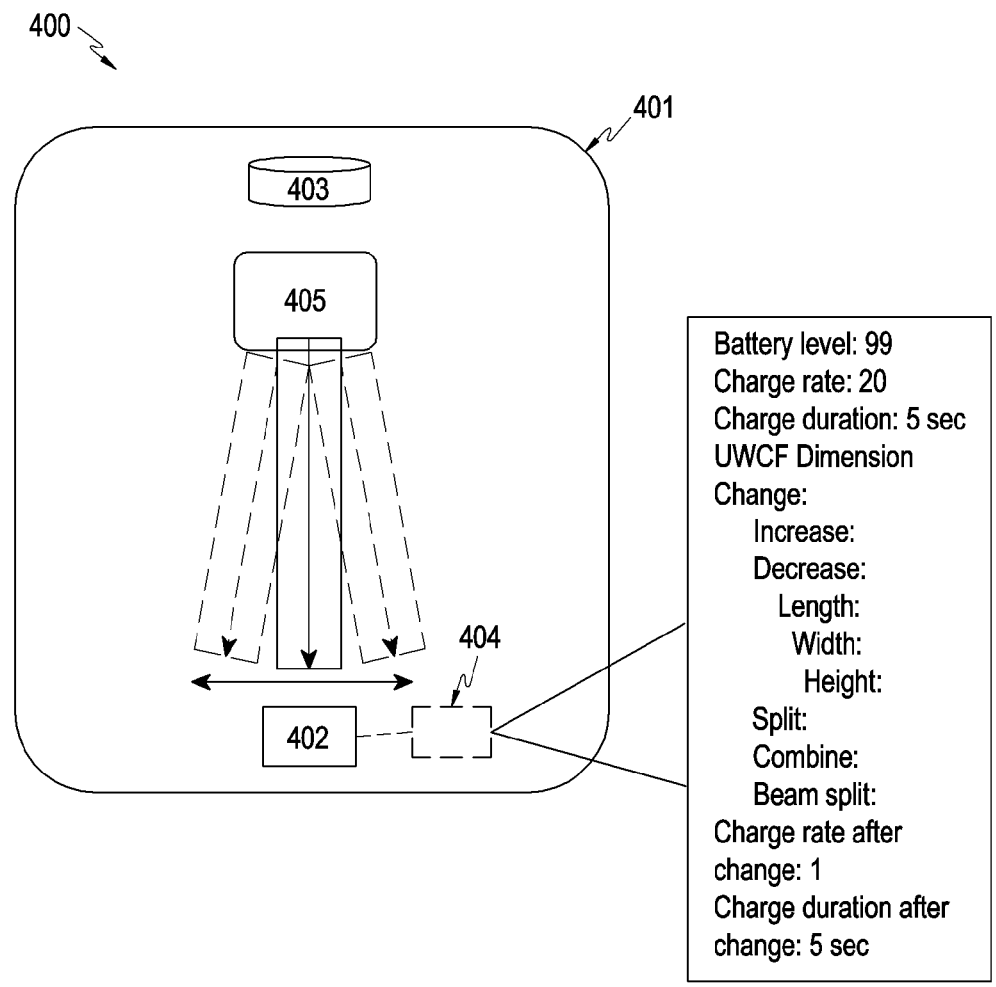

[Fig. 4f]
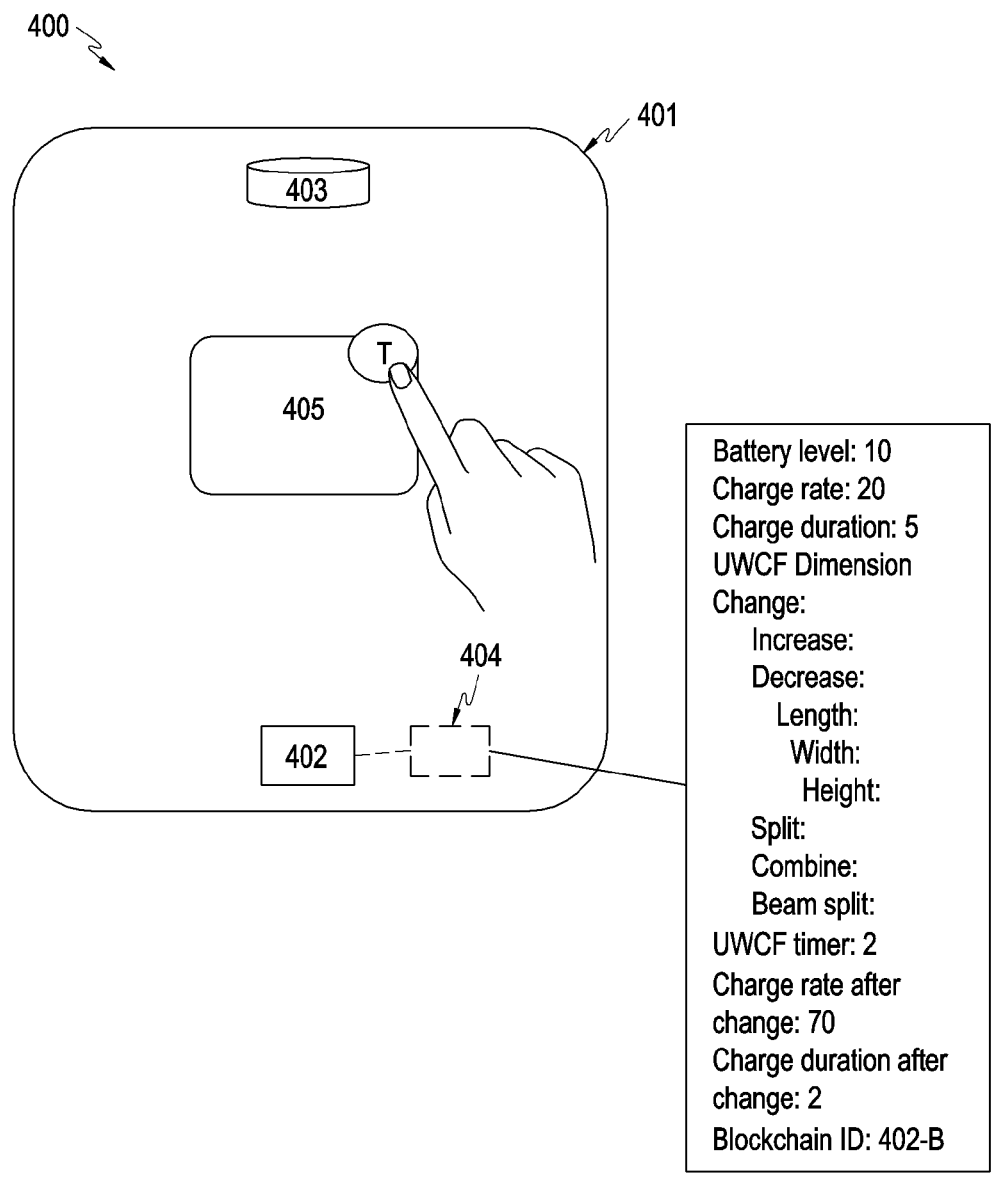

[Fig. 5]
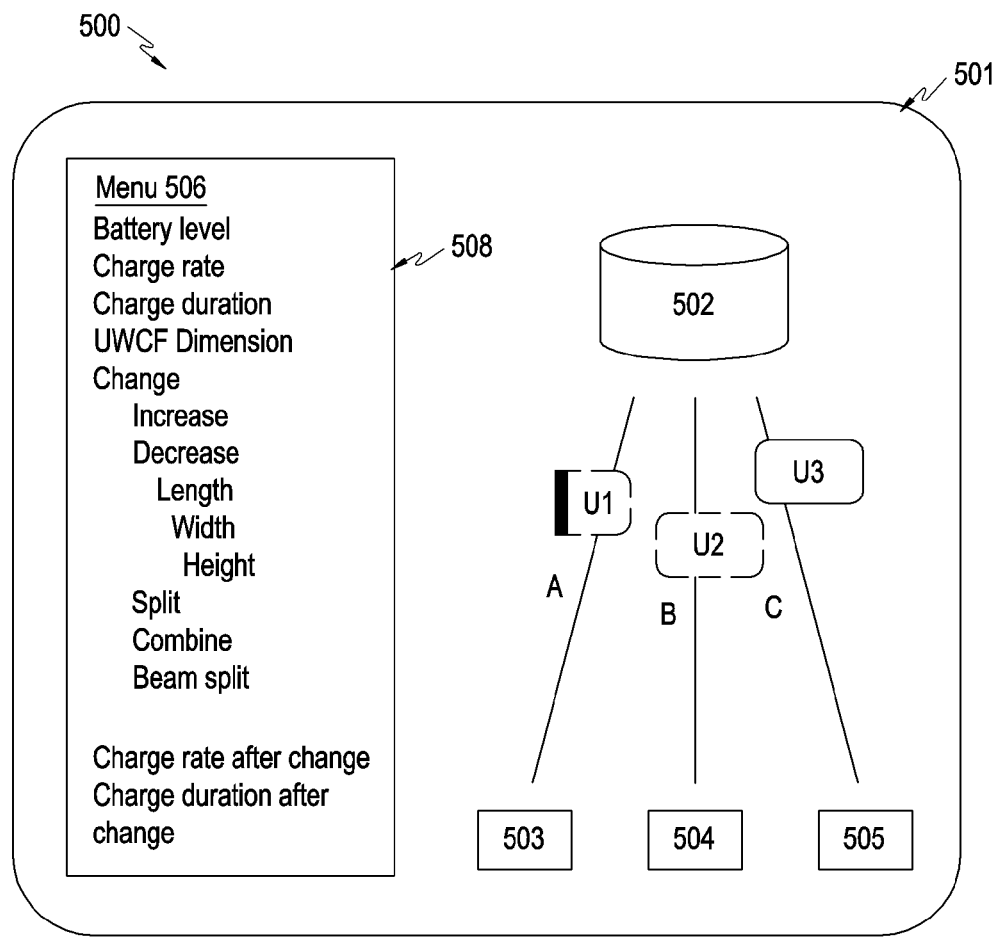

APPARATUS AND METHOD FOR TRANSMITTING A SIGNAL IN A WIRELESS POWER TRANSMITTER

CROSS-REFERENCE TO RELATED APPLICATION(S)

This application is a National Phase Entry of PCT International Application No. PCT/KR2019/006090, which was filed on May 21, 2019, and claims priority to Indian Patent Application No. 201811022745, which was filed on Jun. 18, 2018, the content of which is incorporated herein by reference.

TECHNICAL FIELD

The present disclosure relates to wireless charging of computing devices and, in particular relates to optimizing power transfer in a wireless power transmitter implemented for wirelessly charging computing devices.

BACKGROUND ART

Wireless computing devices such as, laptops, smartphones, tablets, and the like have become an integral part of life. With increased computational capabilities, such devices facilitate easy performance of everyday operational tasks. For instance, individuals nowadays stream multimedia content through such computing devices as opposed to regular television sets. Increased usage of computing devices for performing various tasks results in faster battery depletion of such computing devices. As a result, the devices need to be frequently charged.

With the advent of technology, computing devices nowadays support wireless charging. Conventional wireless charging systems include radio frequency (RF) energy harvesting techniques whereby RF energy provides power to various nodes of a wireless sensor network (WSN) while further extending sensing capabilities of the wireless sensor network. In such scenarios, although wireless power is transmitted to the nodes but such wireless charging systems have not been entirely satisfactory in many respects.

In a conventional wireless charging system, a difference between the direction of a computing device, seeking to be charged, and a direction of a nearby obstacle is computed. When the difference is less than a threshold, the wireless charging system the wireless power transmitting device may charge the computing device while avoiding the obstacle by forming an RF wave through a detour path. However, designing the detour path is a complex process and requires more power and cause additional losses.

In another conventional wireless charging system, backscatter detectors respond to backscatter energy reflected off any obstacle between the device to be charged and the microwave array emitters. In said system, power of such obstructed microwave array emitter is reduced until the obstruction is removed. As may be gathered, said system prevents transmission of wasted microwave power that does not reach the target device when there is an obstruction in the transmission path.

Thus, there exists a need for a solution to overcome at least one of the aforementioned deficiencies.

DISCLOSURE OF INVENTION

Technical Problem

The present disclosure is provided to introduce a selection of concepts in a simplified format that are further described in the detailed description of the subject matter. The present disclosure is not intended to identify key or essential inventive concepts of the claimed subject matter, nor is it intended for determining the scope of the claimed subject matter.

In accordance with the purposes of the subject matter, the present disclosure as embodied and broadly described herein, provides for method and device for beam forming in cellular communication systems.

Solution to Problem

In an aspect of the present disclosure, a method for transmitting a signal in a wireless power transmitter implemented for charging one or more devices is disclosed. The method comprises obtaining device information associated with one or more devices. The device information comprises at least a location of each of the one or more devices. Based on the device information, one or more UWCFs corresponding to the one or more devices are adapted. The UWCF is a sub-area of an open zone, where the open zone is an area having reflection characteristics below a reference reflection threshold. Further, a charging rate for each of the one or more devices based on the device information and the one or more UWCFs is determined. A beamformed signal is then transmitted within corresponding UWCF of each of the one or more devices based on corresponding charging rate for wirelessly charging the one or more devices.

In another aspect of the present disclosure, a wireless power transmitter is disclosed. The wireless power transmitter obtains device information associated with one or more devices. The device information comprises at least a location of each of the one or more devices. Based on the device information, the wireless power transmitter adapts one or more UWCFs corresponding to the one or more devices are adapted. The UWCF is a sub-area of an open zone, where the open zone is an area having reflection characteristics below a reference reflection threshold. Further, the wireless power transmitter determines a charging rate for each of the one or more devices based on the one or more UWCFs is determined. The wireless power transmitter then transmits a beamformed signal within corresponding UWCF of each of the one or more devices based on corresponding charging rate for wirelessly charging the one or more devices.

Advantageous Effects of Invention

The advantages of the subject matter include, but not limited to, selecting potential unique wireless charging frames (UWCFs) that enables secure beam transmission and satisfies both service-quality requirements and security requirements to the maximum. In addition, the present disclosure allows adaptation of the UWCFs based on user inputs and other parameters. This design choice enables the system to be more robust and achieves uninterrupted query resolution.

These aspects and advantages will be more clearly understood from the following detailed description taken in conjunction with the accompanying drawings and claims.

BRIEF DESCRIPTION OF DRAWINGS

To further clarify advantages and aspects of the present disclosure, a more particular description of the present disclosure will be rendered by reference to specific embodiments thereof, which is illustrated in the appended drawings. It is appreciated that these drawings depict only typical embodiments of the present disclosure and are therefore not to be considered limiting its scope. The present disclosure will be described and explained with additional specificity and detail with the accompanying drawings, which are listed below for quick reference.

FIG. 1a illustrates a schematic of a wireless power transmitter, in accordance with an embodiment of the present disclosure r.

FIG. 1b illustrates a schematic of a wireless power transmitter implemented in a distributed manner, according to an embodiment of the present disclosure.

FIG. 1c illustrates an exemplary method for optimizing power transfer in a wireless power transmitter, in accordance with an embodiment of the present disclosure.

FIG. 2 illustrates an exemplary method for optimizing power transfer in a wireless power transmitter, in accordance with an embodiment of the present disclosure.

FIGS. 3a, 3b, 3c, 3d, and 3e illustrate a first exemplary manifestation of the claimed subject matter, in accordance with an embodiment of the present disclosure.

FIGS. 4a, 4b, 4c, 4d, 4e, and 4f illustrate a second exemplary manifestation of the claimed subject matter, in accordance with an embodiment of the present disclosure.

FIG. 5 illustrates a topographical view, in accordance with an embodiment of the present disclosure.

It may be noted that to the extent possible, like reference numerals have been used to represent like elements in the drawings. Further, those of ordinary skill in the art will appreciate that elements in the drawings are illustrated for simplicity and may not have been necessarily drawn to scale. For example, the dimensions of some of the elements in the drawings may be exaggerated relative to other elements to help to improve understanding of aspects of the subject matter. Furthermore, the one or more elements may have been represented in the drawings by conventional symbols, and the drawings may show only those specific details that are pertinent to understanding the embodiments of the subject matter so as not to obscure the drawings with details that will be readily apparent to those of ordinary skill in the art having benefit of the description herein.

MODE FOR THE INVENTION

It should be understood at the outset that although illustrative implementations of the embodiments of the present disclosure are illustrated below, the present disclosure may be implemented using any number of techniques, whether currently known or in existence. The present disclosure should in no way be limited to the illustrative implementations, drawings, and techniques illustrated below, including the exemplary design and implementation illustrated and described herein, but may be modified within the scope of the appended claims along with their full scope of equivalents.

The term "some" as used herein is defined as "none, or one, or more than one, or all." Accordingly, the terms "none," "one," "more than one," "more than one, but not all" or "all" would all fall under the definition of "some." The term "some embodiments" may refer to no embodiments or to one embodiment or to several embodiments or to all embodiments. Accordingly, the term "some embodiments" is defined as meaning "no embodiment, or one embodiment, or more than one embodiment, or all embodiments."

The terminology and structure employed herein is for describing, teaching and illuminating some embodiments and their specific features and elements and does not limit, restrict or reduce the spirit and scope of the claims or their equivalents.

More specifically, any terms used herein such as but not limited to "includes," "comprises," "has," "consists," and grammatical variants thereof do NOT specify an exact limitation or restriction and certainly do NOT exclude the possible addition of one or more features or elements, unless otherwise stated, and furthermore must NOT be taken to exclude the possible removal of one or more of the listed features and elements, unless otherwise stated with the limiting language "MUST comprise" or "NEEDS TO include."

Whether or not a certain feature or element was limited to being used only once, either way it may still be referred to as "one or more features" or "one or more elements" or "at least one feature" or "at least one element." Furthermore, the use of the terms "one or more" or "at least one" feature or element do NOT preclude there being none of that feature or element, unless otherwise specified by limiting language such as "there NEEDS to be one or more . . . " or "one or more element is REQUIRED."

Unless otherwise defined, all terms, and especially any technical and/or scientific terms, used herein may be taken to have the same meaning as commonly understood by one having an ordinary skill in the art.

Reference is made herein to some "embodiments." It should be understood that an embodiment is an example of a possible implementation of any features and/or elements presented in the attached claims. Some embodiments have been described for the purpose of illuminating one or more of the potential ways in which the specific features and/or elements of the attached claims fulfil the requirements of uniqueness, utility and non-obviousness.

Use of the phrases and/or terms such as but not limited to "a first embodiment," "a further embodiment," "an alternate embodiment," "one embodiment," "an embodiment," "multiple embodiments," "some embodiments," "other embodiments," "further embodiment", "furthermore embodiment", "additional embodiment" or variants thereof do NOT necessarily refer to the same embodiments. Unless otherwise specified, one or more particular features and/or elements described in connection with one or more embodiments may be found in one embodiment, or may be found in more than one embodiment, or may be found in all embodiments, or may be found in no embodiments. Although one or more features and/or elements may be described herein in the context of only a single embodiment, or alternatively in the context of more than one embodiment, or further alternatively in the context of all embodiments, the features and/or elements may instead be provided separately or in any appropriate combination or not at all. Conversely, any features and/or elements described in the context of separate embodiments may alternatively be realized as existing together in the context of a single embodiment.

Any particular and all details set forth herein are used in the context of some embodiments and therefore should NOT be necessarily taken as limiting factors to the attached claims. The attached claims and their legal equivalents can be realized in the context of embodiments other than the ones used as illustrative examples in the description below.

FIG. 1a illustrates a schematic of a wireless power transmitter 100 implemented for wirelessly charging one or more computing devices, in accordance with an embodiment of the present disclosure.

In an implementation, the wireless power transmitter 100 may be a single device, such as a wireless charger. In another implementation, the wireless power transmitter 100 may be implemented in a distributed manner. In said implementation, the wireless power transmitter 100 may include multiple devices operating together for wirelessly charging the one or more computing devices. For instance, the wireless power transmitter 100 may include a central node and a plurality of wireless charging panels communicatively coupled to the central node. In said example, each of the wireless charging panels include a transmitter for transmitting power to the one or more computing device and, is connected to and operated through a controller present in the central node.

Examples of the computing devices may include, but are not limited to, a smartphone, a laptop, a tablet, a personal digital assistant, and the like.

In an example, the wireless power transmitter 100 may be implemented in a region, for example, a room, for wirelessly charging the computing devices present in the region. As may be understood, the region may include other objects, such as table, chair, lamps, and closet. Such objects may serve as an obstacle during charging of the computing devices. According to aspects of the present disclosure, the wireless power transmitter 100 is configured to analyse the region, determine the optimal paths for wirelessly charging the computing devices, and adaptively charge the computing devices. A detailed description of the aspects of the present disclosure is provided below.

In an implementation, the wireless power transmitter 100 includes a processor 102, a transceiver 104, an analysis module 106, an adaptation module 108, and an Augmented Reality (AR)/Virtual Reality (VR) module 110. The wireless power transmitter further includes data 112. The analysis module 106, the adaptation module 108, and the AR/VR module 110 may be implemented as, signal processor(s), state machine(s), logic circuitries, and/or any other device or component that manipulate signals based on operational instructions. Further, the analysis module 106, the adaptation module 108, and the AR/VR module 110 can be implemented in hardware, instructions executed by a processing unit, or by a combination thereof. The processing unit can comprise a computer, a processor, a state machine, a logic array or any other suitable devices capable of processing instructions. The processing unit can be a general-purpose processor, which executes instructions that cause the general-purpose processor to perform required tasks, or, the processing unit can be dedicated to perform the required functions. In another example, the analysis module 106, the adaptation module 108, and the AR/VR module 110 may be machine-readable instructions (software) which, when executed by a processor/processing unit, perform any of the described functionalities. The data 112 may be a repository/storage medium/data store, for storing data processed, received, and generated by one or more of the analysis module 106, the adaptation module 108, and the AR/VR module 110.

In an example, for analysing the region, the transceiver 104 transmits a plurality of millimetre (mm) waves in the region. The mm waves are reflected back by the objects present in the region and are received by the transceiver 104. In other words, the transceiver 104 receives a set of reflected waves associated with the objects. The set of reflected waves include a reflected wave corresponding to each of the plurality of mm waves.

The set of reflected waves is subsequently analysed by the analysis module 106 to identify one or more obstructive items and one or more open zones in the region. The one or more obstructive items include the objects as mentioned above and may further include human body. The open zone may be understood as a zone that has negligible obstructive items.

For identifying the obstructive items and the open zones, the analysis module 106 compares the set of reflected waves with a reference threshold. The reflected waves that are above the reference threshold are identified to be corresponding to obstructive items, whereas the reflected waves that are below the reference threshold are identified to be corresponding to an open zone. Furthermore, in an example, the analysis module 106 determines the locations of the obstructive items and the open zones based on a direction of the corresponding transmitted mm waves. In an example, the information related to the obstructive items and the open zones is stored in the data 112. Thus, after analysing the region, the wireless power transmitter 100 learns about the obstructive items and the open zones present in the region.

In an example, the computing devices present in the region may seek to get charged wirelessly. Accordingly, the computing devices may transmit their corresponding device information to the wireless power transmitter 100. In an implementation, the analysis module 106 obtains the device information associated with the computing devices.

In an example, the device information includes a location of each of the computing devices. The device information further may further include a priority level associated with each of the computing devices and a current battery level of each of the computing devices. The device information may further include a blockchain identity of each of the computing devices and a blockchain ledger of each of the computing devices. The blockchain ledger of a computing device may include information associated with previous charging sessions of the computing device. Further, the device information may include a time duration for which each of the computing devices is to be charged and a battery level of each of the computing devices after predetermined duration.

Upon receiving the device information, the analysis module 106 determines one or more unique wireless charging frames (UWCFs) corresponding to the one or more computing devices. A UWCF may be understood as a sub-area of the open zone in which a beamformed signal may be transmitted towards a computing device for wirelessly charging the computing device. The UWCF provides for higher sensitivity in specific, desired directions and allows formation of high directional and efficient beam with minimal losses and overheads. In an example, at least one UWCF for each of the computing devices may be determined.

In an example, the analysis module determines the UWCFs based on the corresponding location of the computing devices, the identified obstructive items, and the open zones. As an example, for determining a UWCF for a computing device A, the analysis module 106 at first identifies the location of the computing device A. Once the location is identified, the analysis module 106 determines whether there are any obstructive items along the path to computing device A or whether the computing device A is in an open zone. In an example, where the path to computing device A includes obstructive items, the analysis module 106 may provide charging information to the computing device A to notify the computing device A about open zones. The charging information is transmitted through the transceiver 104. In another case where the computing device A is determined to be in an open zone, the analysis module 106 may determine a distance and direction to computing device A and accordingly may determine a UWCF that is to be used for wirelessly charging the computing device A.

Once the UWCFs corresponding to the computing devices are determined, the UWCFs may be adapted and accordingly a charging rate for each of the computing devices may be determined.

In an implementation, the adaptation module 108 adapts the one or more UWCFs corresponding to the one or more computing devices based on the device information. In an example, the adapting of the UWCFs may include increasing/decreasing a dimension of the UWCFs. The dimension may include, without limitation, a height, a width and a length of the one or more UWCFs. The adaptation of the UWCFs may further include splitting of the one or more UWCFs. Further, the adaptation of the UWCFs may include splitting the beamformed signal within the one or more UWCFs. Further, the adaptation of the UWCFs may include combining at least two UWCFs from the one or more UWCFs. Following are some examples of the adaptation of the UWCFs based on the device information.

In an example, the adaptation module 108 may analyse the priority of each of the computing device for adaptation of the UWCFs. As an example, say, the computing device A has highest priority level. Accordingly the adaptation module 108 adapts a UWCF associated with the computing device A based on the priority level. The adaptation of the UWCF associated with the computing device A may include increasing a dimension such as a height, a width and a length of the UWCF associated with the computing device A. In response to the adaptation of the UWCF associated with the computing device A, the charging rate of the computing device A is determined such that the wireless power transmitter 100 transmits a more powerful beamformed signal within the UWCF associated with the computing device A in order to charge the computing device A faster.

In another example, the adaptation module 108 may analyse a current battery level of each of the computing devices for adaptation of the UWCFs. The current battery level of the computing device A may be sufficiently charged. Thus, in such a case, the adaptation module 108 adapts the UWCF associated with the computing device A based on the current battery level. For example the adaptation of the UWCF includes decreasing the dimension of the UWCF associated with the computing device A. Accordingly, the charging rate is determined. The wireless power transmitter 100 transmits a beamformed signal having less power as less slow charging of the computing device A is now required.

In another example, the adaptation module 108 may analyse the blockchain identity and the blockchain ledger of the computing devices for adaptation of the UWCFs. In said example, when a computing device A seeks to get wirelessly charged, the wireless power transmitter 100 may receive a blockchain identity, say, BL-A, of the computing device. Upon receiving the BL-A, the wireless power transmitter 100 may query a distributed database of blockchain type using the BL-A for obtaining a charging ledger associated with the computing device A. The charging ledger may be understood as a ledger comprising information related to previous charging sessions of the computing device A. The charging ledger may include details such as an identity of the previous wireless power transmitters, user preferences for charging, previous user actions/requests in terms of increasing decreasing charging rate, and the like.

The distributed database, in an example, may be understood as a network of interconnected devices storing charging ledger related to computing devices. In an example, the network of interconnected devices may be a network of interconnected wireless power transmitters. In another example, the network of interconnected devices may include various network devices, computing devices, storage devices, wireless power transmitting devices, and the like for realizing a distributed database of blockchain type.

As may be understood, as the distributed database is of blockchain type, the charging ledger related to the computing device A is uniform across all the interconnected devices. In response the querying, the wireless power transmitter 100 obtains the charging ledger of the computing device A.

In an example, the wireless power transmitter 100 may itself be a node/device of the distributed database. In such a case, the wireless power transmitter 100 does not perform the aforementioned step of querying as the charging ledger of the computing device A is available with the wireless power transmitter 100.

In an implementation, in addition to the charging ledger, a contract associated with the computing device A may also obtained or retrieved using the BL-A of the computing device A. The contract, in an example, may include terms and conditions related to initiation and termination of wireless charging session.

Based on the charging ledger of the computing device A, the analysis module 106 analysis the information associated with previous charging sessions of the computing device A. As an output of the analysis, in an example, the analysis module 106 determines the optimal charging rate and charging preferences of the user. Accordingly, the analysis module 106 also determines whether there is a need to combine or split the UWCFs. The analysis is stored in the data 112. Based on the analysis stored in the data 112, the adaptation module 108 adapts the UWCFs associated with the computing device A. The adaptation may include splitting the UWCFs, splitting the beamformed signal within the UWCFs and/or combining at least two UWCFs from the one or more UWCFs. Accordingly, the charging rate of the computing devices A is determined. Upon determination of the charging rate for the computing device A, the charging session of the computing device A is initiated as per the contract. Furthermore, the charging ledger A may be updated by the analysis module 106. The updation may include recording information about the current charging session and all user actions/gestures/requests affecting the charging rate performed by the user. As may be understood, the charging ledger is updated uniformly across all the interconnected devices. A flowchart depicting the aforementioned example is provided below in FIG. 1c.

In another example, the adaptation module 108 may analyse a time duration for which each of the computing devices is to be charged for adaptation of the UWCFs. The adaptation module 108 adapts the UWCF associated with the computing devices such that to increase or increase the dimension of the UWCF based on the time duration left for charging. Accordingly, the charging rate of the computing devices can be determined.

In another example, the adaptation module 108 may analyse a battery level of each the computing devices after predetermined duration for adaptation of the UWCFs. Suppose that the computing device A after some is at battery level 90 percent and another computing device B is at battery level 30 percent. In such a case, the adaptation module 108 adapts the UWCFs associated with the computing devices A and B such that the UWCF associated with computing device A may be split and joined/combined with the UWCF corresponding to the computing device B. Accordingly, the charging rate of the computing devices A and B can be determined.

In an implementation, once the UWCFs are adapted, the adaptation module 108 determines a charging rate for the computing devices based on the UWCFs. As an example, for determining the charging rate for a computing device A, the adaptation module 108 analyses the corresponding UWCF (s) and identifies the dimensions, for example, length, width, of the UWCF. Based on the dimensions of the UWCF(s), the adaptation module 108 determines the charging rate with which the computing device A is to be charged.

Once the charging rates for the computing devices are determined, the transceiver 104 transmits a beamformed signal within the corresponding UWCF of each of the computing devices for wirelessly charging the computing devices.

In an implementation, the UWCFs may be adapted based on user inputs. In said implementation, the analysis module 106 provides charging information to the one or more computing devices. The charging information may include information related to the one or more UWCFs, information associated with the charging rate of the one or more computing devices, and information indicative of a current battery level of the one or more computing devices.

Based on the charging information, a user of a computing device may seek to change the UWCF corresponding to the computing device. Accordingly, the user may provide a user input for affecting a change in the UWCF. Based on the user input, the computing device may transmit a user request to the wireless power transmitter 100. In an example, the transceiver 104 may receive the user request from the computing device. Subsequently, the adaptation module 108 may analyse the user input based on the user request and may adapt the UWCF in a manner as described above.

In an implementation, the charging information transmitted to the computing devices may be in augmented reality (AR) format. In another implementation, the charging information transmitted to the computing devices may be in virtual reality (VR) format. In yet another implementation, the charging information transmitted to the computing devices may be in both AR format and VR format. In said implementation, a computing device that supports AR mode may view the charging information in AR format, whereas a computing device that supports VR mode may view the charging information in VR mode. In an example, the AR/VR module 110 converts the charging information into AR format and VR format prior to the transmitting.

In the above implementations, the user input for changing the UWCF may be a user gesture of the user performed in respect of the AR view or the VR view, as the case may be. Subsequently, the user input received is analysed by the AR/VR module 110 and thereafter, the adaptation 108 adapts the UWCF based on the user input.

Furthermore, in the above implementations, in response to the user gesture for changing the UWCF, a related change may be viewed in the AR view or the VR view. For instance, a change in the charging rate, battery level, etc., may be viewed in the AR view or the VR view. Furthermore, in an example, an adaptation recommendation corresponding to best possibility for charging the computing device may be provided to the user as a suggestion for the user input. In an example, the adaptation recommendation may be determined by the analysis module 106. In an example, the adaptation recommendation may include, but is not limited to, suggesting a time of charge, suggesting a charging effect, suggesting a beamformed signal change effect, suggesting a UWCF change, for example, splitting and combining, and the like.

FIG. 1b illustrates a schematic of the wireless power transmitter 100 implemented in a distributed manner, according to an embodiment of the present disclosure. As can be seen in the figure, the wireless power transmitter 100 includes a central node 114. The central node 114 includes the processor 102, the analysis module 106, the adaptation module 108, and the AR/VR module 110, and the data 112. The central node 114 is communicatively coupled to a plurality of wireless charging panels 116. Each of the wireless charging panels includes the transceiver 104.

FIG. 1c illustrates a flowchart of a method 120 for optimizing power transfer in a wireless power transmitter implemented for wirelessly charging one or more computing devices, in accordance with one embodiment of the present disclosure.

At block 122, a blockchain identity associated with a computing device is received. In an example, a wireless power transmitter may receive the blockchain identity of the computing device.

At step 124, a charging ledger associated with the computing device is obtained. The charging ledger as explained above may include details such as an identity of the previous wireless power transmitters, user preferences for charging, previous user actions/requests in terms of increasing decreasing charging rate, and the like.

In an example, the charging ledger is obtained by querying a distributed database of blockchain type based on the blockchain identity. In response to the querying, the charging ledger associated with the computing device is obtained. In another example, where the wireless power transmitter is in itself a node of the distributed database, the charging ledger is stored in a storage medium of the wireless power transmitter. In said example, the charging ledger is obtained from the storage medium.

Furthermore, a contract associated with the computing device may also be obtained. The contract, in an example, may include terms and conditions related to initiation and termination of wireless charging session for wirelessly charging the computing device.

At block 126, a charging session is initiated based on the charging ledger of the computing device. Based on the charging ledger of the computing device A, the information associated with previous charging sessions of the computing device is analysed. As an output of the analysis, in an example, the optimal charging rate and charging preferences of the user are determined. Furthermore, it is also determined whether the UWCFs that are implemented for charging the computing device are to be combined or split.

Based on the analysis the UWCFs associated with the computing device may be adapted. The adaptation may include splitting the UWCFs, splitting the beamformed signal within the UWCFs and/or combining at least two UWCFs from the one or more UWCFs. Based on the adaptation, the charging rate is determined and the charging session of the computing device is initiated as per the contract.

At step 128, the charging ledger associated with the computing device is updated. The updation may include recording information about the current charging session and all user actions/gestures/requests affecting the charging rate performed by the user. As may be understood, the charging ledger is updated uniformly across all interconnected devices of the distributed database.

FIG. 2 illustrate an exemplary method 200, according to embodiments of the present matter. The order in which the method 200 is described is not to be construed as a limitation, and any number of the described method blocks can be combined in any order to implement the method 200 or an alternative method. Additionally, individual blocks may be deleted from the method 200 without departing from the scope of the subject matter described herein. Furthermore, the method 200 can be implemented in any suitable hardware, software, firmware, or combination thereof. As an example, the method 200 may be implemented by the wireless power transmitter 100 and components thereof, as described above in FIGS. 1a and 1b.

Referring to FIG. 2, a method 200 for optimizing power transfer in a wireless power transmitter implemented for wirelessly charging one or more computing devices, in accordance with one embodiment of the present disclosure, is illustrated.

At block 202, device information associated with one or more computing devices is obtained. In an example, a wireless power transmitter may be implemented in a region for wirelessly charging the computing devices present in the region. The device information received comprises at least a location of each of the one or more computing devices.

At block 204, one or more UWCFs corresponding to the one or more computing devices are adapted based on the device information such. The UWCF may be understood as a sub-area of an open zone of the region. The open zone is an area of the region having reflection characteristics below a reference reflection threshold. In other words, the open zone has negligible obstruction items and provides for an optimal path for wirelessly charging the computing devices. Adaptation of the UWCFs may include increasing/decreasing a dimension of the one or more UWCFs. The dimension includes at least a height, a width and a length. The adaptation may further include splitting the one or more UWCFs. Further, the adaptation may include splitting the beamformed signal within the one or more UWCFs. The adaptation may further include combining at least two UWCFs from the one or more UWCFs.

At block 206, a charging rate for each of the one or more computing devices based on the one or more UWCFs is determined. In an example, based on the corresponding UWCF(s) of a computing device, the charging rate is determined. For instance, based on the dimensions of the UWCF, number of UWCFs associated with the computing device, the charging rate is determined.

At block 208, a beamformed signal is then transmitted within corresponding UWCF of each of the one or more computing devices based on corresponding charging rate for wirelessly charging the one or more computing devices.

FIGS. 3a-3e illustrates a first exemplary manifestation 300 of the claimed subject matter, in accordance with one embodiment of the present disclosure. In said exemplary manifestation 300, the terminologies are analogous to that of FIGS. 1a, 1b and 2.

FIG. 3a shows four obstructive items (B1, B2, B3 and B4) in the region identified by the analysis module 106. Further, it is shown that three UWCF's (U1, U2 and U3) are determined by the analysis module 106 corresponding to four computing devices (C1, C2, C3 and C4). The first UWCF (U1) is associated with the first computing device (C1), the second UWCF (U2) is associated with the second computing device (C2) and the third computing device (C3) and, the third UWCF (U3) is associated with the fourth computing device (C4).

The analysis module 106 obtains device information associated with the four computing devices (C1, C2, C3 and C4). On the basis of the device information the adaptation module 108 adapts the second UWCF (U2) such that a beamformed signal (S) to be transmitted within the second UWCF (U2) is split into a beamformed signal (S1) and a second beamformed signal (S2) for charging the second and the third computing device (C2, C3), respectively. The adaptation module 108 determines the charging rate for each of the four computing devices (C1, C2, C3 and C4) based on the three UWCF's (U1, U2 and U3).

Once the charging rates are determined, the transceiver 104 transmits a beamformed signal (R) within the first UWCF (U1) for wirelessly charging the first computing device (C1). Likewise, the transceiver 104 transmits the first and the second beamformed signal (S1, S2) within the second UWCF (U2) for wirelessly charging the second and the third computing device (C2, C3). Further, the transceiver 104 transmits a beamformed signal (T) within the third UWCF (U3) for wirelessly charging the fourth computing device (C4).

Referring to FIG. 3b, in one implementation, the adaptation module 108 adapts the second UWCF (U2) such that the second UWCF (U2) is split into a UWCF (U21) and another UWCF (U22). The UWCF (U21) corresponds to the second computing device (C2) and the UWCF (U22) to the third computing device (C3). The adaptation module 108 determines the charging rate for each of the four computing devices (C1, C2, C3 and C4) based on the first UWCF (U1), the UWCF (U21), the UWCF (U22) and the third UWCF (U3). The transceiver 104 transmits a beamformed signal (S) within the UWCF (U21) and a beamformed signal (Q) within another UWCF (U22).

In another implementation, as shown in FIG. 3c, the adaptation module 108 adapts the second UWCF (U2) and the third UWCF (U3) such that the second UWCF (U2) and the third UWCF (U3) are combined to form a combined UWCF (U4) corresponding to the second, the third and the fourth computing device (C2, C3 and C4). The adaptation module 108 determines a charging rate for each of the four computing devices (C1, C2, C3 and C4) based on the first UWCF (U1) and the combined UWCF (U4). The transceiver 104 transmits a beamformed signal (P) within the combined UWCF (U4) for charging the second, the third and the fourth computing device (C2, C3 and C4) through the single beamformed signal (P).

Referring to FIG. 3d, in another implementation, the analysis module 106 obtains the device information associated with the four computing devices (C1, C2, C3 and C4). The device information includes the location of each of the four computing devices (C1, C2, C3 and C4). Thereafter, the analysis module 106 determines UWCFs that is to be used for wirelessly charging the four computing devices (C1, C2, C3 and C4), say the first UWCF (U1) for the first computing device (C1).

In one example, the first computing device (C1) associated with the first UWCF (U1) is near in distance to the first UWCF (U1). The adaptation module 108 accordingly adapts the first UWCF (U1) such that the dimension of the first UWCF (U1) is decreased thereby decreasing bandwidth of the beamformed signal (R). Once the first UWCF (U1) is adapted, the adaptation module 108 determines the charging rate for each of the four computing devices (C1, C2, C3 and C4) based on the first UWCF (U1), the second UWCF (U2) and the third UWCF (U3). The charging rate for the first computing device (C1) corresponding to the first UWCF (U1) is decreased as power of the transmitted beamformed signal (R) is lowered.

In one example as shown in FIG. 3e, the first computing device (C1) associated with the first UWCF (U1) is farther in distance to the first UWCF (U1). Therefore, the adaptation module 108 accordingly adapts the first UWCF (U1) such that the dimension of the first UWCF (U1) is increased thereby increasing bandwidth of the beamformed signal (R). Once the first UWCF (U1) is adapted, the adaptation module 108 determines the charging rate for each of the four computing devices (C1, C2, C3 and C4) based on the first UWCF (U1), the second UWCF (U2) and the third UWCF (U3). The charging rate for the first computing device (C1) corresponding to the first UWCF (U1) is increased as power of the transmitted beamformed signal (R) increases.

As would be understood, there may be different number of obstructive items, UWCF's and the computing devices. The number mentioned in the said embodiment is exemplary for understanding purposes and cannot be construed as a limitation to the said exemplary manifestation.

FIGS. 4a-4f illustrates a second exemplary manifestation 400 of the claimed subject-matter, in accordance with another embodiment of the present disclosure. In said exemplary manifestation 400, the terminologies are analogous to that of FIGS. 1a, 1b and 2.

FIG. 4a shows a computing device 401 with display screen providing a view to a user. In an example, the view may be one of a graphical user interface view, an AR view, and a VR view. In the view, a computing device 402, a wireless power transmitter 403 and the charging information 404 of the computing device 402 is displayed on display screen of the computing device 401. As may be understood, the computing device 402 is a graphical representation of a computing device getting charged. In an example, the computing device 401 may be a computing device of an administrator controlling the charging of the computing devices within the region. In another example, the computing device 401 may be same as the computing device 402. As can be seen in the figure, the computing device 402 is being wirelessly charged by the wireless power transmitter 403 using a beamformed signal transmitted within the UWCF 405.

Referring to FIG. 4a, consider an example where a user of the computing device 402 is in a hurry and desires to have the computing device 402 charged at a faster rate. In such a case, the user inputs a gesture to increase (shown by dotted lines) the dimension of a UWCF 405 associated with the computing device 402 for increasing the charging rate. The desired dimension of the UWCF 405 is shown as 406 in the figure. The user input is transmitted by the computing device 401 to the wireless power transmitter 403 in the form of a user request. Based on the user request, the wireless power transmitter 403 adapts the UWCF 405. Upon adaptation of the UWCF 405, the charging rate is increased proportionally. Accordingly, the battery level of the computing device 402 gradually levels up from 20 to 50 percent and the charging duration decreases from 2 to 1 hours.

Referring to FIG. 4b, a use case where the user desires to further increase the charging rate is illustrated. As can be seen in the figure, the user may desire to further increase the charging rate. Accordingly, the user again provides a user gesture to further increase the dimension of the UWCF 405. The desired dimension of the UWCF is shown as 407 in the figure. The user gesture is transmitted by the computing device 401 as a user request to the wireless power transmitter 403. Based on the user request, the wireless power transmitter 403 adapts the UWCF 405. Upon adaptation of the UWCF 405, the charging rate of the computing device 402 is increased proportionally. In response, the battery level of the computing device 402 gets charged at a faster rate.

As may be observed from FIGS. 4a and 4b, increase in dimension of the UWCF 405 results in proportionate increase in the charging rate of the computing device 405. For instance, increase in the dimensions of the UWCF 405 results in an increase of the charging rate to 40 from 20. Accordingly, a proportionate decrease in the charging time is observed. For instance, the charging duration, i.e., time left to full charge is reduced from 1 hour to half an hour. As may be understood, with the decrease in the dimensions of the UWCF 405, a proportionate decrease in the charging rate and a proportionate increase in the charging duration is affected.

In an implementation shown in FIG. 4c, a computing device 402, a wireless power transmitter 403, the charging information 404 of the computing device 402, a computing device 405 and the charging information 406 of the computing device 405 is displayed on display screen of the computing device 401. The aforementioned entities are shown in a view that may be one of a regular graphical user interface view, a VR view, or an AR view.

As shown in the figure, a UWCF 407 is associated with the computing device 402. In an example, the user inputs a user gesture to split (shown by dotted lines) the UWCF 407. The user gesture is transmitted by the computing device 401 as a user request to the wireless power transmitter 403. Based on the user request, the UWCF 407 is split and a UWCF 408 is formed and associated with the computing device 405. Accordingly, the charging rate for the computing device 402 is split, say, into half. As a result, the computing device 402 and 405 now gets charged at a charging rate half of that of original charging rate of the computing device 402.

In another implementation shown in FIG. 4d, a computing device 402, a wireless power transmitter 403 and the charging information 404 of the computing device 402 is displayed on display screen of the computing device 401. The aforementioned entities are shown in a view that may be one of a regular graphical user interface view, a VR view, or an AR view.

In an example, the user inputs the gesture to combine (shown by dotted lines) a UWCF 405 with another UWCF 406. The user gesture is transmitted by the computing device 401 as a user request to the wireless power transmitter 403. Based on the user request, the UWCF 405 is adapted by the wireless power transmitter 403 such that the UWCF 405 and the UWCF 406 are combined. For example, the charging rate for the computing device 402 increases from 20 to 60 percent thereby increasing the battery level to 80 percent.

In another example, a blockchain ID (402-A) associated with the computing device 402 is received by the wireless power transmitter 403. Based on the blockchain ID, the wireless power transmitter 403 may obtain the charging ledger and optionally, a contract associated with the computing device 402. Based on the charging ledger, the wireless power transmitter 403 may provide the user with a suggestion to combine the UWCF 405 and the UWCF 406. In response to the suggestion provided by the wireless power transmitter 403, the user may subsequently provide the user gesture as explained above. Accordingly, the combining of the UWCF 405 and 406 may occur as explained above.

In yet another implementation shown in FIG. 4e, a computing device 402, a wireless power transmitter 403 and the charging information 404 of the computing device 402 is displayed on display screen of the computing device 401. The aforementioned entities are shown in a view that may be one of a regular graphical user interface view, a VR view, or an AR view.

In said implementation, the user inputs the gesture to split (shown by dotted lines) a beamformed signal within the UWCF 405. For example, the battery level of the computing device 402 has reached 99 percent. In such a case, the user may split the beamformed signal to charge a further computing device (not shown in the figure). As such, the charging duration of the computing device 402 is not affected.

FIG. 4*f* shows the computing device 401 with display screen providing a view. The view includes a computing device 402, a wireless power transmitter 403 and the charging information 404 of the computing device 402 is displayed on display screen of the computing device 401. The aforementioned entities are shown in a view that may be one of a regular graphical user interface view, a VR view, or an AR view.

In an example, the user sets a timer (T) to set a time duration for charging the computing device 402 associated with the UWCF 405. Based on the user's setting of the timer, a user request is transmitted by the computing device 401 to the wireless power transmitter 403. As can be seen, based on the time input, the charge duration is changed from 5 hours to 2 hours. In an example, based on the timer and the current battery level of the computing device 402, the UWCF 405 may be adapted. For instance, as can be seen, the current battery level is at 10 units and the timer is set to 2 hours. Considering the aforementioned parameters, the UWCF 405 may be adapted to increase the dimensions of the UWCF 405 to increase the charging rate.

In another example, a blockchain ID (402-B) associated with the computing device 402 is received by the wireless power transmitter 403. Based on the blockchain ID, the wireless power transmitter 403 may obtain the charging ledger and optionally, a contract associated with the computing device 402. Based on the charging ledger, the wireless power transmitter 403 may provide the user with a suggestion to decrease the charging time from 5 hours to 2 hours. In response to the suggestion provided by the wireless power transmitter 403, the user may subsequently provide set the timer to 2 hours as explained above. Accordingly, the charging duration is reduced to 2 hours and the UWCF 405 is adapted accordingly to increase the charging rate.

FIG. 5 illustrates a topographical view 500 of a region in which the computing devices are getting charged. The topographical view 500 may be presented to the user in one of an AR view, a VR view, or as a graphical user view. As shown in the figure, on a display of a computing device 501, there is shown a graphical representation of a wireless power transmitter 502, computing devices 503, 504, and 505, UWCFs, U1, U2, U3, and beamformed signals A, B, C.

In an example, the user may be presented with a menu 506 for affecting various adaptations as described above. Upon selecting the menu 508, a list 508 of options is presented to the user. As shown in the list, the user may perform any of the aforementioned described adaptations, such as increasing/decreasing dimensions of the UWCF, splitting or combining UWCFs, and the like. In addition, current battery level, charging rate, and charging duration may also be presented to the user.

Furthermore, in an example, a visual indicator indicative of a current charge of the computing device is also presented to the user on a UWCF corresponding to the computing device. For instance, as shown in the figure, the UWCF U1 displays the current charge status of computing device 503.

In an example, the visual indicator may be displayed on the periphery of the graphical representations of the UWCFs. As shown in the figure, periphery of the UWCF U2 displays a dotted line indicating a current charge of the computing device 504. As and when the computing device 504 gets fully charged, the dotted line may turn into a complete line. As may be understood, the above visual indicator schemes are non-limiting and other visual indicator schemes may be implemented.

While specific language has been used to describe the present disclosure, any limitations arising on account thereto, are not intended. As would be apparent to a person in the art, various working modifications may be made to the method in order to implement the inventive concept as taught herein. The drawings and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment.

The invention claimed is:

1. A method for transmitting a signal in a wireless power transmitter implemented for charging one or more devices, the method comprising:
   obtaining device information associated with the one or more devices, wherein the device information comprises at least a location of each of the one or more devices;
   adapting one or more frames corresponding to the one or more devices based on the device information, wherein a frame is a sub-area of an open zone, and wherein the open zone is an area having reflection characteristics below a reference reflection threshold;
   determining a charging rate for each of the one or more devices based on the one or more frames; and
   transmitting a beamformed signal within corresponding frame of each of the one or more devices based on corresponding charging rate for charging the one or more devices.

2. The method as claimed in 1, wherein the device information further comprises, at least one of:
   a priority level associated with each of the one or more devices;
   a current battery level of each of the one or more devices;
   a blockchain identity of each of the one or more devices;
   a blockchain ledger of each of the one or more devices, wherein the blockchain ledger comprises information associated with previous charging sessions of each of the one or more devices;
   a time duration for which each of the one or more devices is to be charged; and
   a battery level of each of the one or more devices after predetermined duration.

3. The method as claimed in claim 1, wherein the adapting comprises at least one of:
   increasing a dimension of the one or more frames, wherein the dimension includes at least a height, a width and a length;
   decreasing a dimension of the one or more frames, wherein the dimension includes at least a height, a width and a length;
   splitting the one or more frames;
   splitting the beamformed signal within the one or more frames; and
   combining at least two frames from the one or more frames.

4. The method as claimed in claim 1, wherein the method further comprises:
   providing charging information to the one or more devices, wherein the charging information comprises at least one of: information related to the one or more frames, information associated with the charging rate of the one or more devices, visual indicator indicative of a current battery level of the one or more devices, and information indicative of a current battery level of the one or more devices; and receiving a user request from at least one device, from the one or more devices, for affecting a change in the corresponding frame; and adapting the at least one frame based on the user request, wherein the adapting comprises at least one of:

increasing a dimension of the corresponding UWCF, wherein the dimension includes at least a height, a width and a length;

decreasing a dimension of the corresponding frame, wherein the dimension includes at least a height, a width and a length;

splitting the corresponding frame;

splitting the beamformed signal within the corresponding frame; and combining a further frame with the corresponding frame.

5. The method as claimed in claim 4, wherein a format of the charging information is such that the charging information is presented on the one or more devices in at least one of an AR view and a VR view.

6. The method as claimed in claim 5, wherein the user request includes a user input based on a user gesture performed in respect of one of the AR view and the VR view.

7. The method as claimed in claim 1, wherein the method further comprises:

transmitting a plurality of millimetre waves in a region;

receiving a set of reflected waves, wherein the set of reflected waves comprises a reflected wave corresponding to each of the plurality of millimetre waves;

identifying one or more obstructive items and one or more open zones in the region based on the set of reflected waves; and determining the one or more frames corresponding to the one or more devices based on the corresponding location of the devices, the identified obstructive items, and the one or more open zones.

8. The method as claimed in claim 7, wherein the method further comprises determining a set of offsets based on the device information, wherein the set of offsets is indicative of a deviation of the one or more devices from the corresponding one or more frames.

9. The method as claimed in claim 1, wherein the charging rate is directly proportional to at least one dimension of the frame, wherein the at least one dimension is one of the length, the width, and the height of the frame.

10. A wireless power transmitter comprising:

a processor;

an analysis module to obtain device information associated with the one or more devices, wherein the device information comprises at least a location of each of the one or more devices;

an adaptation module to:

adapt one or more frames corresponding to the one or more devices based on the device information, wherein a frame is a sub-area of an open zone, and wherein the open zone is an area having reflection characteristics below a reference reflection threshold; and determine a charging rate for each of the one or more devices based on the one or more frames, and a transceiver to transmit a beamformed signal within corresponding frame of each of the one or more devices based on corresponding charging rate for wirelessly charging the one or more devices.

11. The wireless power transmitter as claimed in claim 10, wherein the device information obtained by the analysis module comprises:

a priority level associated with each of the one or more devices;

a current battery level of each of the one or more devices;

a blockchain identity of each of the one or more devices;

a blockchain ledger of each of the one or more devices, wherein the blockchain ledger comprises information associated with previous charging sessions of each of the one or more devices;

a time duration for which each of the one or more devices is to be charged; and a battery level of each of the one or more devices after predetermined duration.

12. The wireless power transmitter as claimed in claim 10, wherein the adaptation module is further adapted to perform at least one of:

increasing a dimension of the one or more frames, wherein the dimension includes at least a height, a width and a length;

decreasing a dimension of the one or more frames, wherein the dimension includes at least a height, a width and a length;

splitting the one or more frames;

splitting the beamformed signal within the one or more frames; and combining at least two frames from the one or more frames.

13. The wireless power transmitter as claimed in claim 10, wherein the system further comprises a AR/VE module adapted to:

provide charging information to the one or more devices, wherein the charging information comprises at least one of: information related to the one or more frames; information associated with the charging rate of the one or more devices; visual indicator indicative of a current battery level of the one or more devices; information indicative of a current battery level of the one or more devices;

receive a user request from at least one device, from the one or more devices, for affecting a change in the corresponding frame; and adapt the at least one frame based on the user request, wherein the adapting comprises at least one of:

increasing a dimension of the corresponding frame, wherein the dimension includes at least a height, a width and a length;

decreasing a dimension of the corresponding frame, wherein the dimension includes at least a height, a width and a length;

splitting the corresponding frame;

splitting the beamformed signal within the corresponding frame; and combining a further UWCF with the corresponding frame.

14. The wireless power transmitter as claimed in claim 13, wherein a format of the charging information is such that the charging information is presented on the one or more devices in at least one of an AR view and a VR view, and wherein the user request includes a user input based on a user gesture performed in respect of one of the AR view and the VR view.

15. The wireless power transmitter as claimed in claim 10, wherein the analysis module is further adapted to:
- transmitting a plurality of millimetre waves in a region;
- receiving a set of reflected waves, wherein the set of reflected waves comprises a reflected wave corresponding to each of the plurality of millimetre waves;
- identifying one or more obstructive items and one or more open zones in the region based on the set of reflected waves; and
- determining the one or more frames corresponding to the one or more devices based on the corresponding location of the devices, the identified obstructive items, and the one or more open zones.

\* \* \* \* \*